(12) United States Patent
Carr

(10) Patent No.: US 7,146,083 B2
(45) Date of Patent: Dec. 5, 2006

(54) ETCHED PLATE ALIGNMENT METHOD AND APPARATUS

(75) Inventor: Charles D. Carr, Ann Arbor, MI (US)

(73) Assignee: IMRA America, Inc., Ann Arbor, MI (US)

(*) Notice: Subject to any disclaimer, the term of this patent is extended or adjusted under 35 U.S.C. 154(b) by 61 days.

(21) Appl. No.: 10/813,161

(22) Filed: Mar. 31, 2004

(65) Prior Publication Data

US 2005/0220415 A1 Oct. 6, 2005

(51) Int. Cl.
G02B 6/26 (2006.01)
(52) U.S. Cl. .............................. 385/52; 385/88; 385/90; 385/91; 385/97; 216/24
(58) Field of Classification Search .................. 385/51, 385/88, 90, 91, 97; 216/24
See application file for complete search history.

(56) References Cited

U.S. PATENT DOCUMENTS

| | | | |
|---|---|---|---|
| 4,034,187 A | 7/1977 | Tomioka et al. | |
| 4,807,956 A | 2/1989 | Tournereau et al. | |
| 4,897,360 A | 1/1990 | Guckel et al. | |
| 5,249,733 A | 10/1993 | Brady et al. | |
| 5,347,869 A | 9/1994 | Shie et al. | |
| 5,644,837 A | 7/1997 | Fathi et al. | |
| 5,708,566 A | 1/1998 | Hunninghaus et al. | |
| 6,070,851 A | 6/2000 | Tsai et al. | |
| 6,112,001 A | 8/2000 | Kishida et al. | |
| 6,292,499 B1 | 9/2001 | Pearson et al. | |
| 6,344,148 B1 | 2/2002 | Park et al. | |
| 6,380,513 B1 | 4/2002 | Remy De Graffenried | |
| 6,443,631 B1 | 9/2002 | Case et al. | |
| 6,543,114 B1 | 4/2003 | Atia et al. | |
| 6,571,041 B1* | 5/2003 | Bourcier et al. | 385/52 |
| 6,632,028 B1 | 10/2003 | Yang et al. | |
| 6,841,486 B1* | 1/2005 | Boudreau et al. | 438/719 |
| 2003/0108304 A1 | 6/2003 | Ziari et al. | |
| 2003/0169977 A1 | 9/2003 | Xu et al. | |
| 2004/0052470 A1* | 3/2004 | Kim et al. | 385/52 |
| 2005/0018969 A1* | 1/2005 | Deane | 385/49 |

* cited by examiner

*Primary Examiner*—John D. Lee
*Assistant Examiner*—James D. Stein
(74) *Attorney, Agent, or Firm*—Sughrue Mion, PLLC

(57) ABSTRACT

An alignment apparatus for optical components includes chemically co-etched parts which may be assembled with high tolerances and in a repeatable manner. The resulting construction, together with a translatable stage and/or a micrometer, allows for rapid and extremely precise alignment of the mounted optics.

9 Claims, 5 Drawing Sheets

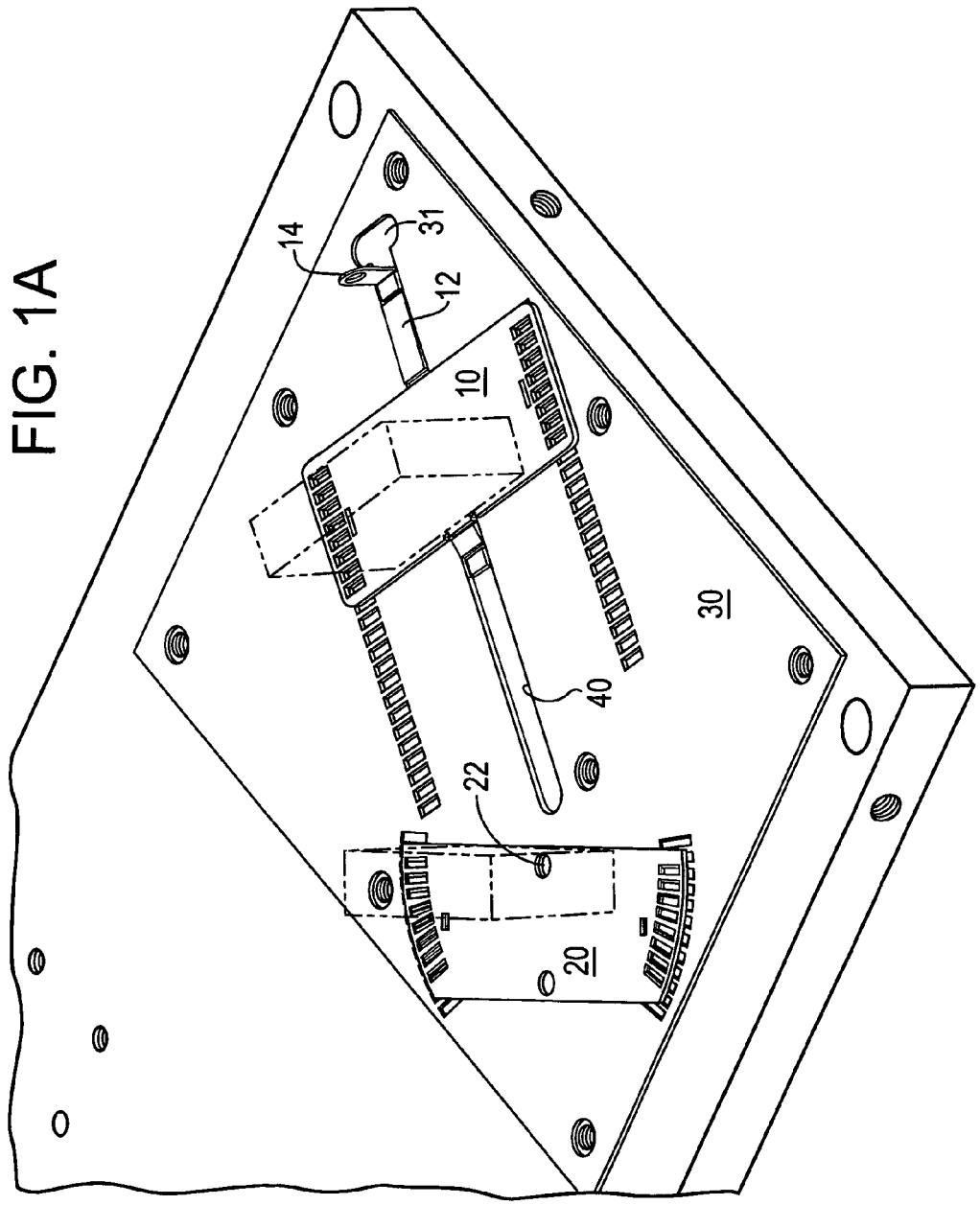

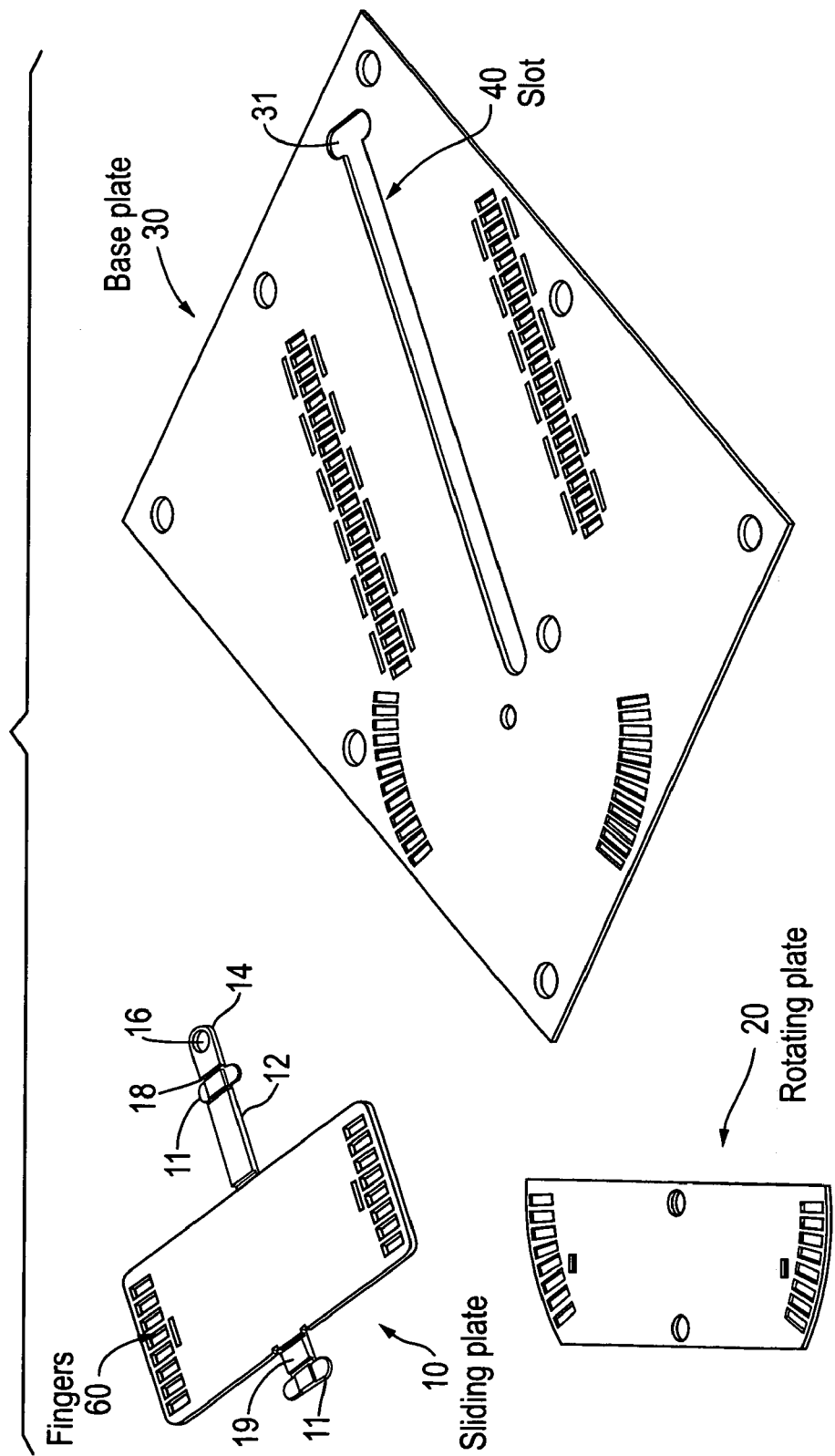

t' is the thickness of the base plate where it is etched next to the slot

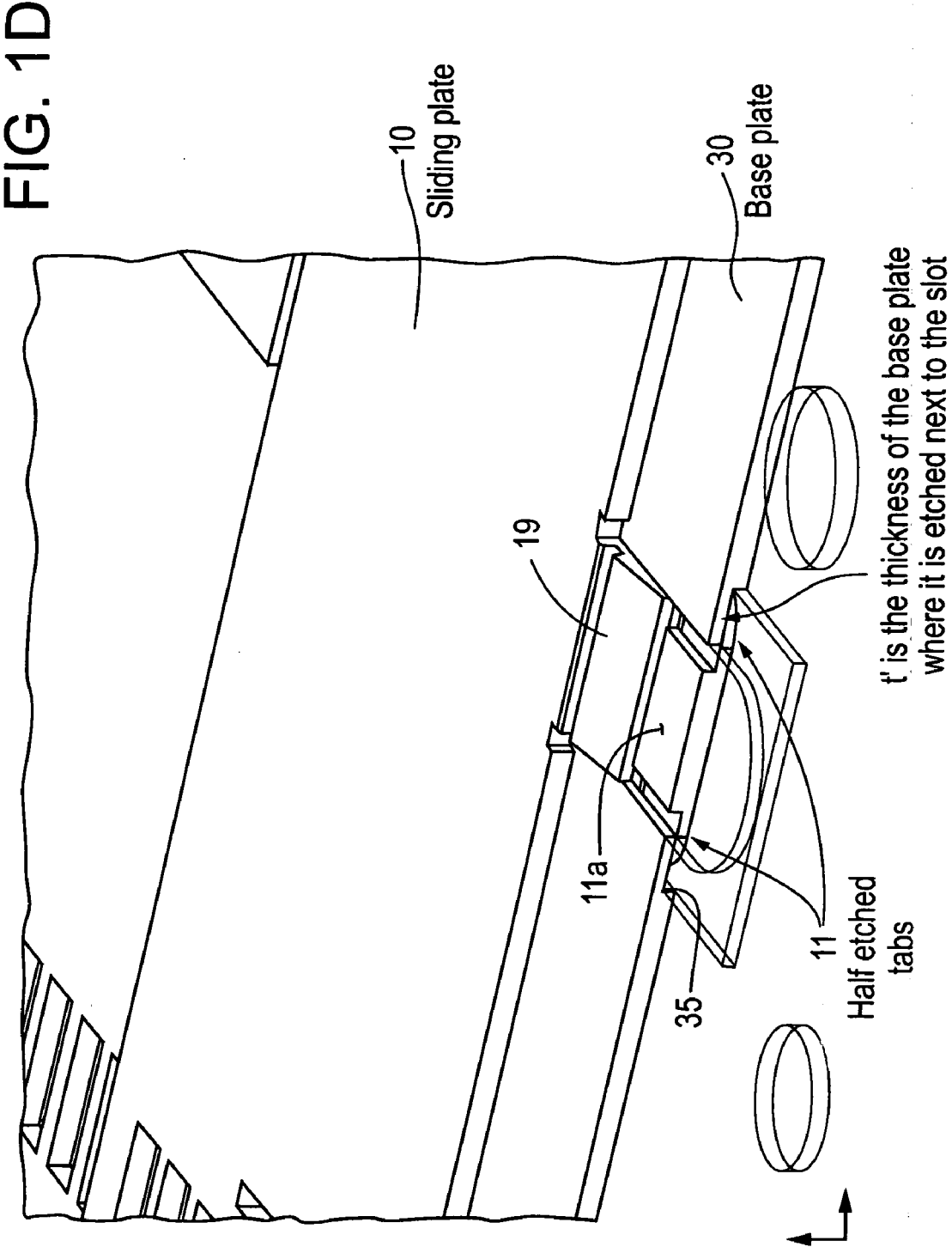

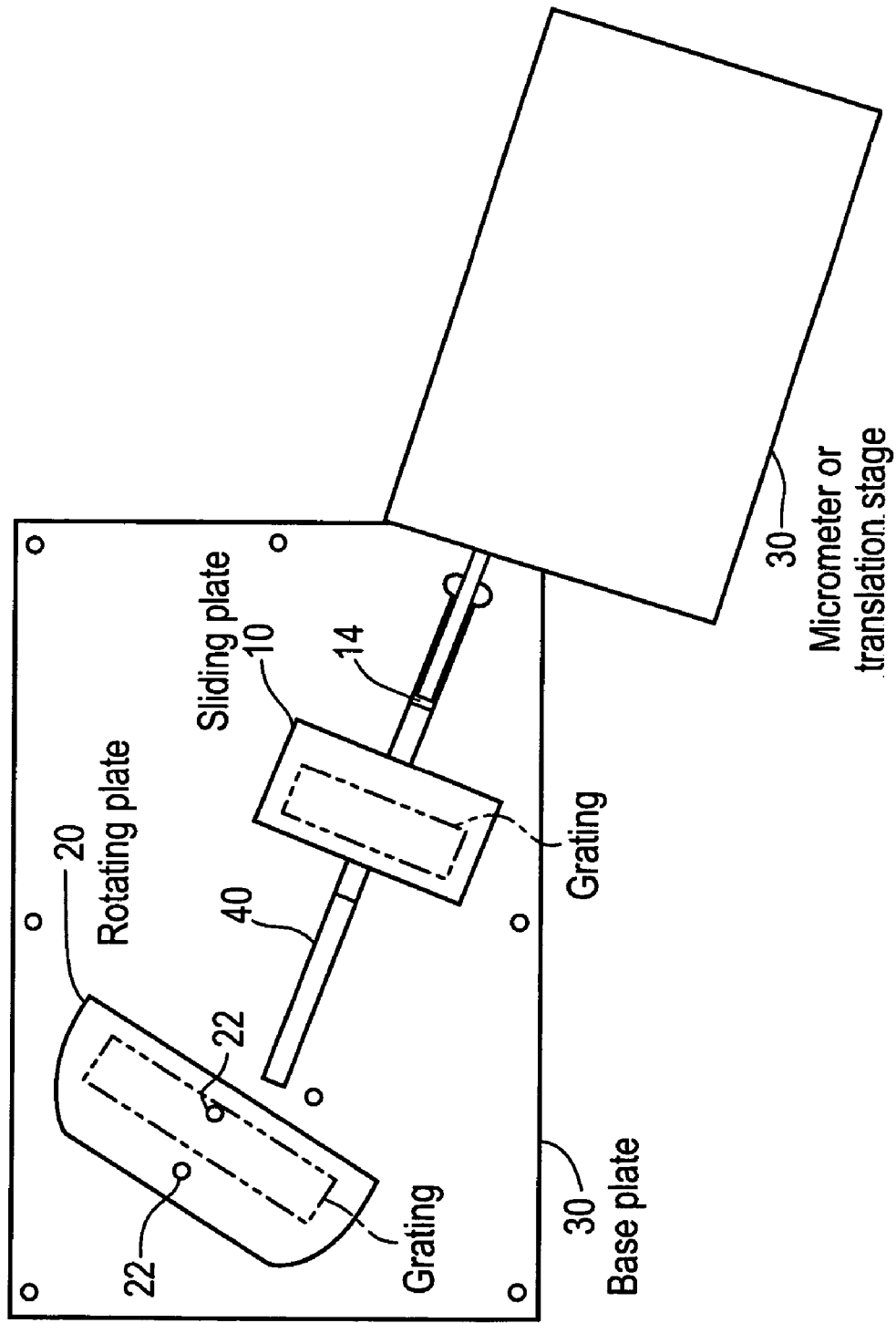

ETCHED PLATE ALIGNMENT METHOD AND APPARATUS

FIELD OF THE INVENTION

The present invention relates to a method and apparatus for aligning optical components. Specifically, the invention is a mounting bracket that is used to align optical components.

BACKGROUND OF THE INVENTION

Alignment problems are frequently encountered in the manufacture of optical system. Typically, optical components must be aligned with each other with a precision on the order of 1 micron to minimize losses within the system. There are a number of solutions to this problem that are currently being implemented in the industry.

U.S. Pat. No. 6,292,499 B1 reveals a technique that uses resistance heaters on the optical mount to melt solder placed beneath it, allowing movement of the mount for optical alignment. The optical mount is a T-shaped ceramic piece such that the material properties of the ceramic can help damp harmful effects of the optical component due to vibration. The optical component is mounted on the upright portion of the T and the resistance heater is added to the horizontal portion of the T-shaped mount. Solder is added to the bottom of the resistance heater and when melted, it is used to attach the optical mount to the optical bench. Small electrical wires are attached to the resistance heater, providing the path for a voltage drop across the heater when movement of the optical component is needed. Repositioning is straightforward if an alignment mechanism is used. When the optical component is in place, the voltage can be turned off, allowing the solder to cool and locking the mount in place. However, wires and resistance heaters take up valuable space within an optical system. It would be better if the optical components could just be aligned, locked in place and put into the optical system with as few parts as possible.

Another solution involves etching V-grooves in silicon substrates to be used for optical alignment. U.S. Pat. No. 6,344,148 B1 uses the process of chemical etching to produce V-grooves that serve as alignment marks, solder containment regions and for aligning optical fiber. The optical component is placed on the substrate and is optically aligned with a microscope, using the etched V-grooves as markers. Solder is then placed in a second set of grooves to adjust the height of the optical component and to clamp it to the substrate, completing alignment. The alignment is based on human vision and the accuracy of results confirmed by looking through a microscope. This process is tedious and time-consuming, especially if the optical components are aligned passively. It would be more beneficial to use translation stages and an active alignment technique rather than trying to passively align the optical components by "feel".

The previous techniques all use solder or adhesive to mount optical components once they have been aligned. Solder and adhesives can present their own challenges and there have been few innovative solutions created that make working with these elements easier. For example, flux is always needed when using solder, and problems have come about from using flux in certain applications. U.S. Pat. No. 5,249,733 explains that when trying to mount optical components to a substrate, the flux can bubble up under the heat from the soldering process and cause the optical element to fall out of alignment. The solution to this problem was to create a gaseous formic acid shield around the flux during the alignment operation, to allow the solder to form symmetrical configurations under the optical element that are needed in the process of self-alignment. The formic acid atmosphere eliminates the need for flux and the problems that come along with it.

According to U.S. Pat. No. 6,632,028, a eutectic solder is used that reacts with a component in the bond pads of the optical mount. This chemical reaction causes the solder to harden and lock the optical components in place. Most importantly, damage to optical components and the substrate is eliminated because damaging thermal energy is not needed to melt the solder.

Adhesives are also used for locking optical components in alignment. U.S. Pat. No. 5,644,837 explains a method of using thermoplastic and thermosetting resins to attach optical components to a substrate. Microwave energy is used to cure the resins, speeding up cure time and preventing the substrate and optical components from being exposed to harsh cure environments because the microwave energy can be localized and shielded from other components.

U.S. Pat. No. 4,807,956 reveals a technique for aligning an optical fiber using solder or polymer preforms. The preform is wrapped around the fiber at the location where the fiber is to attach to the substrate. The preform and fiber are set on top of a resistor that is used to heat the preform to a temperature that will soften it and allow movement of the fiber. At this point, the fiber can be aligned with an optical component or laser and the current going to the resistor should be shut off. Cooling of the preform sets the fiber in place. This process uses localized heating to melt the preform and keep heat away from other optical components.

As mentioned above, solder and adhesives have always played a leading role in the alignment process but they have not always been easy to work with, especially in the case of removing an optical component from a mount. It has been necessary to develop techniques for quickly and easily rearranging optical components on mounting brackets to avoid ruining a component or wasting valuable time.

Finally, it is necessary to mention that the general manufacturing process for optical mounting brackets has been precision machining. Machining, however, can be a time-consuming and expensive process and it is a process that many companies are trying to avoid.

SUMMARY OF THE INVENTION

The present invention introduces a method for the precision alignment of two optical components relative to each other in an optical system. Prior art alignment brackets and stages were custom-machined and therefore the multiple precision brackets and stages needed in a given system were prohibitively expensive.

This invention takes advantage of current etching techniques to create mounting brackets. Etching is a much faster and more simple process than machining, and affords lower cost, since multiple parts can be produced with the same precision simultaneously. Furthermore, the invention incorporates alignment features that reduce the time needed to align optical components. The only tool needed for locking alignment is a soldering device.

BRIEF DESCRIPTION OF THE DRAWINGS

FIG. 1A is an elevational view of an optical system to which the alignment device of the invention is mounted; and showing optical elements mounted to the alignment device;

FIG. 1B illustrates the three main components of the alignment device, e.g., the base plate, sliding plate and rotating plate;

FIG. 1D illustrates the sliding connection between the sliding plate and the base plate; and FIG. 2 schematically illustrates the base plate, sliding plate and rotating plate as assembled and with optical elements mounted thereon, together with a stage or other active alignment system for setting the alignment.

DETAILED DESCRIPTION OF THE PREFERRED EMBODIMENTS

Figure 1C:
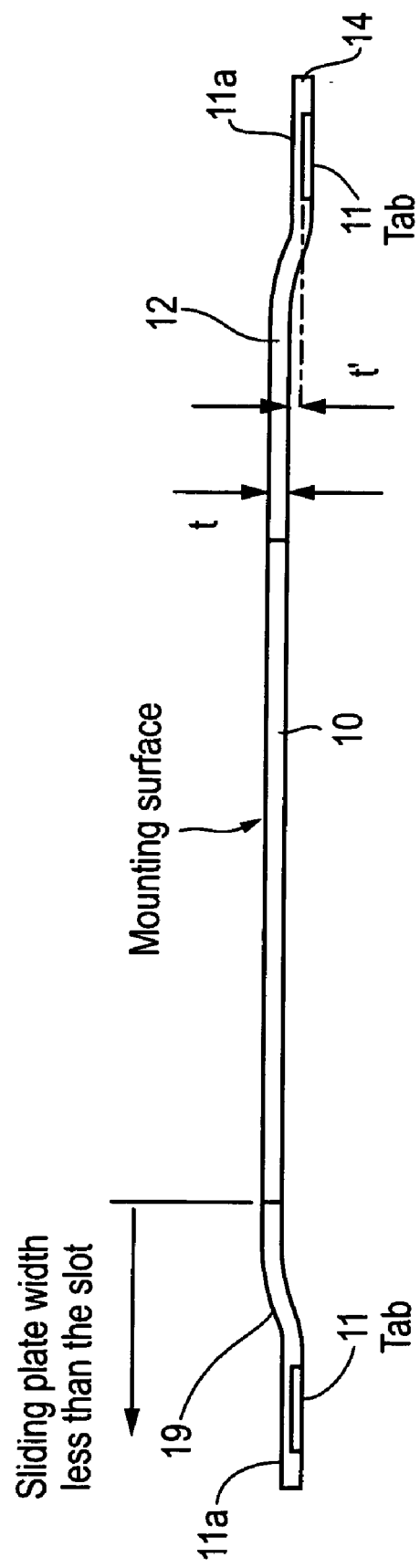
FIG. 1C illustrates the sliding plate in side view.

Three plates with chemically etched geometry are fixed together to make up the alignment bracket. Two optical component mounting plates 10, 20 are mechanically fixed to a base plate 30. One of the plates 10 is constrained to slide back and forth in a slot 40, hereafter referred to as the sliding plate. The other mounting plate 20 is constrained to rotate about a small pin on the base plate, hereafter referred to as the rotating plate.

The slot 40 provides a range of travel for the sliding plate 10 and thus it should be known at approximately within what range the optical components will be in alignment so as to create a slot of appropriate length. Mounting holes are arbitrarily placed around the alignment bracket for fixing an optical system. The alignment bracket can be scaled to accommodate the size of any optical component.

The invention is manufactured using standard chemical etching procedures. The mounting holes, slot 40 and fingers 60 are all chemically etched into the plates. There is only one mechanical fastener on the alignment bracket and that is the small pin 22 used to hold the rotating plate in place. However, it would also be possible to design an etched feature on the base plate that could form or be bent into a pin, thus eliminating all mechanical fasteners and reducing the number of parts.

The sliding plate 10 is held in position by half-etched (e.g., half-thickness) tabs 11 that were formed during the etching process, located on the front and rear of the plate 10. The tabs 11 are wing-like in shape and are wider than the slot, protruding just slightly from the front and rear ends of the sliding plate 10. They are positioned below the surface of the base plate, which is also half-etched on its underside on either side of the slot, and hold the sliding plate from coming out of the slot. The half-etching allows the tabs and the slot to fit together as shown in FIG. 1D so that the non-etched land areas 11a adjacent the tops of the tabs are flush with the upper surface of the base plate, to allow for flush mounting of the alignment bracket except for the area used as the element mounting surface, the latter being joined by transition portions 19 (see FIG. 1C). In addition, there is a tab 14, with a hole 16 in the middle, connected to the rear protrusion 12 of the sliding plate that is used for connecting an alignment device such as a translation stage or micrometer 30, as shown in FIG. 2. Half etching is also used to define bend lines, such as indicated at 18 near the hole 16 just mentioned. The tab is bent at 90 degrees (vertically) to the top of the alignment bracket (see FIG. 2). The half-etch defines the place of bending and also removes enough material to make bending the tab easier.

Before aligning the optical components, the rotating plate is placed over the pin and the sliding plate is slipped into the slot via aperture 31, and finally the alignment tool 30 can be attached to the sliding plate. The heat isolation fingers 60 in the plates and bracket can be configured as a Vernier-type measuring scale for ease in aligning the plates. When the components have been aligned, the optical mounting plates can be soldered to the base plate, after which the linear alignment tool 30 can be removed. If future re-alignment of the optical components is required, the alignment mechanism can be reattached and the solder can be melted for movement of the sliding and rotating plates.

The invention lessens the problems of heat dissipation when soldering the mounts to the base plate. Heat isolating fingers 60 have been incorporated on all three plates. These fingers are located on the edges of the optical mounting plates 10, 20 and are positioned along either side of the slot of the base plate and in a semi-circular pattern at a distance away from the axis of rotation approximately equal to the radius of the rotating plate. When the components have been aligned, a soldering iron can be placed on the fingers, which act to trap the heat by forcing the thermal energy to flow through a specific path, significantly reducing heat dissipation. This heat isolating effect allows the area that needs to be soldered to heat up much faster and prevents the whole alignment bracket from being heated generally. The temperature of the fingers will reach the melting point of the solder much faster and will allow the solder to melt quickly with minimum distortion to the alignment bracket.

Thus, while only certain embodiments of the invention have been specifically described herein, it will be apparent that numerous modifications may be made thereto without departing from the spirit and scope of the invention as defined in the claims which follow:

What is claimed is:

1. An optical alignment apparatus, comprising:
   a base plate,
   a rotatable plate rotatably mountable on the base plate; and
   a sliding plate slideably mountable on the base plate; and
   wherein said sliding plate and said rotatable plate include surfaces for mounting optical components thereon, and each of the base plate, said sliding plate and said rotatable plate include features manufactured to the same tolerance by being simultaneously chemically etched, and wherein said base plate includes a slot for guiding said sliding plate, and an underside surface which includes first etched regions on either side of said slot, and wherein said sliding plate includes extended portions on either side of the mounting surface thereof, ends of said extended portions including transversely projecting tabs, upper surfaces of said tabs being in contact with said first etched regions.

2. An apparatus as claimed in claim 1, wherein said base plate includes a slot for guiding said sliding plate, and an underside surface which includes first etched regions on either side of said slot, and wherein said tabs are etched and said first etched regions are etched such that the bottom of the tabs do not protrude past the bottom of the base plate.

3. An apparatus as claimed in claim 2, wherein said base plate includes a slot for guiding said sliding plate, and an underside surface which includes first etched regions on either side of said slot, and wherein said base plate and said sliding plate are flush mounted at upper surfaces thereof for at least portions of said extended portions of said sliding plate.

4. An optical alignment apparatus, comprising:
   a base plate,
   a rotatable plate rotatably mountable on the base plate; and
   a sliding plate slideably mountable on the base plate; and wherein said sliding plate and said rotatable plate include surfaces for mounting optical components thereon, and each of the base plate, said sliding plate and said rotatable plate include features manufactured to the same tolerance by being simultaneously chemically etched, wherein said base plate includes a slot for guiding said sliding plate, and an underside surface which includes first etched regions on either side of said slot, and wherein each of said base plate, said rotatable plate and said sliding plate include heat isolation areas whereat said sliding plate and said rotatable plate are soldered to said base plate.

5. An apparatus as claimed in claim 4, wherein said base plate includes a slot for guiding said sliding plate, and an underside surface which includes first etched regions on either side of said slot, and wherein said heat isolation areas are configured as a series of spaced lands separated by apertures, such that the series of lands and apertures form a vernier scale for use in alignment of said optical components.

6. An apparatus as claimed in claim 5, wherein said base plate includes a slot for guiding said sliding plate, and an underside surface which includes first etched regions on either side of said slot, and wherein said lands on said sliding plate are equally spaced linearly, and said lands on said rotatable plate are equally spaced radially.

7. A method of making an optical alignment apparatus, comprising;
providing a base plate, and a rotatable plate and a sliding plate for mounting to said base plate;
etching a slot in said base plate for mounting said sliding plate;
etching grooves in an underside of said base plate on either side of said slot;
etching transversely extending tabs on said sliding plate in a thickness direction thereof;
mounting said sliding plate to said base plate such that said tabs ride in said grooves and upper surfaces of said sliding plate are flush with said base plate at regions apart from an optical element mounting surface of said sliding plate; and mounting said rotatable plate to said base plate at a pivot point.

8. A method as claimed in claim 7, wherein features of said base plate, said sliding plate and said rotatable plate are provided by a simultaneous etching process.

9. A method of aligning optical components, comprising;
providing a base plate, and a sliding plate and a rotatable plate mountable on said base plate; said plates being prepared through an etching process,
assembling said sliding plate and said rotatable plate to said base plate;
attaching optical components to said sliding plate and said rotatable plate;
attaching a linear stage to said sliding plate for positioning thereof;
aligning said optical components by positioning said sliding plate and said rotatable plate, and
soldering said rotatable plate and said sliding plate to said base plate at heat isolation locations thereof.

* * * * *